UNITED STATES PATENT OFFICE.

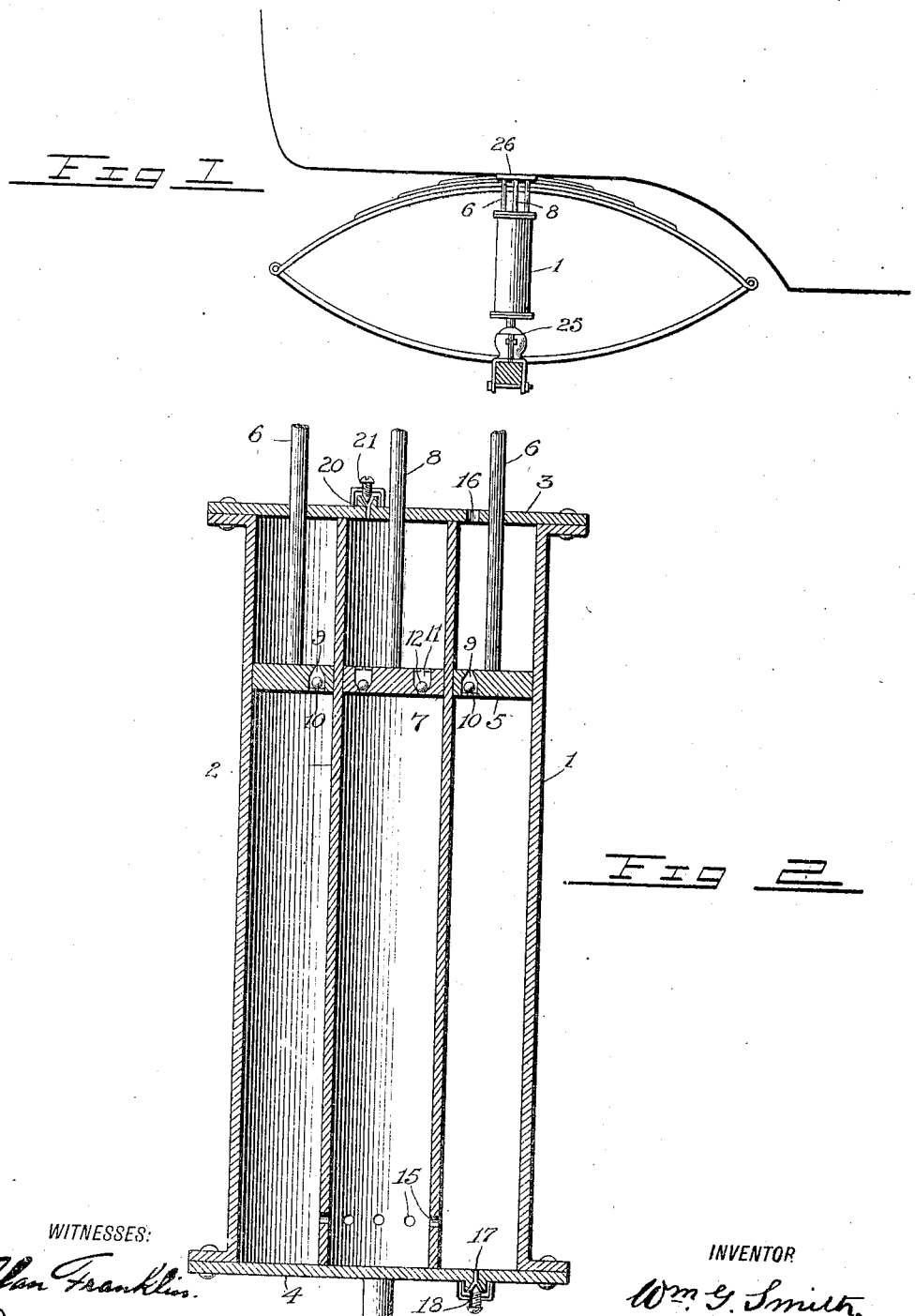

WILLIAM G. SMITH, OF SANTA CLARA, CALIFORNIA.

SHOCK-ABSORBER.

1,151,909.

Specification of Letters Patent.  Patented Aug. 31, 1915.

Application filed April 26, 1915. Serial No. 23,818.

*To all whom it may concern:*

Be it known that I, WILLIAM G. SMITH, a citizen of the United States, residing at Santa Clara, in the county of Santa Clara, in the State of California, have made a new and useful Invention—to wit, a Shock-Absorber—and I do hereby declare the following to be a clear and concise and exact description of the same.

The invention contemplates a shock absorber particularly adapted to be used on an automobile in connection with the body springs thereof, to absorb the shock of the depression and rebound of the springs, but I do not confine myself to this particular use of the device, as it may be used for other purposes.

In this specification and annexed drawing, I illustrate the invention in the form which I consider the best, but it is to be understood that I do not limit myself to such form because the invention may be embodied in other forms, and it is also to be understood that in and by the claims following the description herein I desire to cover the invention in whatever form it may be embodied.

Referring to the drawing: Figure 1 is a view illustrating the shock absorber attached to an automobile. Fig. 2 is a vertical longitudinal section of the shock absorber.

The shock absorber comprises a pair of cylinders, an outer cylinder 1 and an inner cylinder 2, the inner cylinder being smaller in diameter than the outer cylinder. A head 3 closes the upper end of said cylinder and a head 4 closes the lower end of said cylinder. An annular ring piston 5 is slidably mounted within the outer cylinder 1 and upon the inner cylinder 2 to which piston is connected piston rods 6 which extend upwardly through the head 3. A piston 7 is slidably mounted within the inner cylinder 2 to which piston is connected a piston rod 8 which extends upwardly through the head 3. Ports 9 extend through the piston 5 in which ports are ball valves 10. Ports 11 extend through piston 7 in which ports are ball valves 12. Ports 15 extend through the lower end of the cylinder 2 and establish communication between the outer cylinder 1 and the inner cylinder. The outer cylinder 1 is provided with an air inlet 16 through the head 3. Said cylinder is also provided with an air outlet 17 through the head 4, in which outlet is located an air regulating needle valve 18. The inner cylinder 2 is provided with an air outlet 20 through the head 3, in which outlet is located an air escapement regulating needle valve 21 which is adjusted to permit such quantity of air to escape as the adjustment may require. The device is mounted upon a ball and socket joint 25 which is secured to the axle of the automobile adjacent the body spring. The upper ends of the piston rods 6 and 8 are connected by means of connection 26 to the automobile body.

The operation of my invention is as follows: Air enters the cylinder 1 above the piston 5 through the inlet 16 and below the piston through the ports 9, the valves 10 being open to permit passage of air through said ports. When the automobile body moves downwardly, it forces the pistons 5 and 7 downwardly through the medium of connection 26 and rods 6 and 8 and the piston 5 and body cushion on the air in cylinder 1. As said pistons move downwardly, the valves 10 close the ports 9 and the piston 5 compresses the air in the cylinder below it and forces the air through the ports 15 into the inner cylinder 2. The compressed air in the cylinder 2 opens the valve 12 and passes through the ports 11 into the space in said cylinder above the piston 7. As the automobile body is forced upwardly by the rebound of the body spring, the pistons 5 and 7 are drawn upwardly by the body through connection 26 and rods 6 and 8. As the piston 7 is drawn thus upwardly, the valves 12 close the ports 11 and the piston 7 compresses the air above it in the cylinder 2 and forces the air out of the cylinder through outlet 20. The valve 21 is so adjusted as to regulate the desired escapement of air. The air in the cylinder 2 above the piston forms a cushion which retards the upward movement of the piston and the body of the automobile under the influence of the rebound of the body spring, whereby the shock of the rebound of the body spring is absorbed.

The degree of absorption of the device may be varied by adjustment of the needle valves 18 and 21 which vary the amount and pressure of air in the cylinders 1 and 2 and the tension of the air cushions below piston 5 in cylinder 1 and above piston 7 in cylinder 2, so that a greater or less force may be required to force the piston 5 downwardly and pull the piston 7 upwardly against said air cushions.

I claim:

1. A shock absorber comprising a pair of cylinders and pistons, an air inlet for one of said cylinders, said cylinders communicating with each other so that as one of said pistons is moved in one direction, air is forced from the cylinder in which it is mounted, into the other cylinder, where it forms an air cushion for the piston in said other cylinder, and a restricted outlet in said other cylinder through which the air is forced by the piston in said cylinder during the rebound action of said piston against said air cushion.

2. A shock absorber comprising a pair of cylinders arranged one within the other, a piston for each of said cylinders, an air inlet for the outer cylinder, said cylinders communicating with each other, so that the piston in the outer cylinder may force air into the inner cylinder where it forms an air cushion for the piston in the inner cylinder, said inner cylinder being provided with a restricted outlet through which the air in the inner cylinder is forced by the piston in said inner cylinder during the rebound action of said piston against said air cushion.

3. A shock absorber comprising a pair of cylinders, a piston for each cylinder, an air inlet for one of said cylinders, said cylinders communicating with each other, a port extending through one of said pistons, a valve in said port adapted to close said port when the piston is moved in one direction so that said piston will force the air in the cylinder in which it moves into the other cylinder, where it forms an air cushion for the piston of said other cylinder, and a restricted outlet in said other cylinder through which the air is forced by the piston in said cylinder during the rebound action of said piston against said air cushion.

4. A shock absorber comprising a pair of cylinders, a piston for each of said cylinders, an air inlet for one of said cylinders, said cylinders communicating with each other so that the piston of one of said cylinders may force air into the other cylinder, the piston in the other cylinder being provided with a port through which the air is forced into the other side of the piston by said first piston, a valve in said port adapted to close the port when the piston moves against the air which has passed through said port, and a restricted outlet through which said air is forced by said piston.

5. A shock absorber comprising a pair of cylinders and pistons, an air inlet for one of said cylinders, said cylinders communicating with each other so that as one of said pistons is moved in one direction, air is forced from the cylinder in which it is mounted into the other cylinder, where it forms an air cushion for the piston in said other cylinder, and a restricted outlet in said other cylinder through which the air is forced by the piston in said cylinder, during the rebound action of said piston against said air cushion, and means in said first cylinder for regulating the pressure of the air cushion.

6. A shock absorber comprising a pair of cylinders and pistons, an air inlet for one of said cylinders, said cylinders communicating with each other so that as one of said pistons is moved in one direction, air is forced from the cylinder in which it is mounted, into the other cylinder, where it forms an air cushion for the piston in said other cylinder, and a restricted outlet in said other cylinder through which the air is forced by the piston in said cylinder during the rebound action of said piston against said air cushion, and an escapement valve in said first cylinder for regulating the pressure of said air cushion.

7. In combination with the body, spring and axle of an automobile, a shock absorber comprising two air cylinders communicating with each other, a piston in each of said cylinders, a piston rod for each piston, said rods being connected to the automobile body, an air inlet for one of said cylinders, the piston in said cylinder being adapted to force the air in said cylinder into the other cylinder as the automobile body moves downwardly and compresses said spring, the piston in the other cylinder being adapted to compress the air therein as the automobile body moves upwardly under the influence of the rebound of said spring, and absorb the shock of said rebound.

In testimony whereof, I have hereunto set my hand at San Francisco, California, this 13th day of April, 1915.

WILLIAM G. SMITH.

In presence of—
ALAN FRANKLIN,
P. S. TIDWELL.